United States Patent

Jouade

[15] 3,662,616
[45] May 16, 1972

[54] SHOCK ABSORBER MEANS, ESPECIALLY FOR A VEHICLE STEERING COLUMN

[72] Inventor: Pierre Jouade, Levallois-Perret, France
[73] Assignee: Paulstra, Levallois-Perret, France
[22] Filed: June 8, 1970
[21] Appl. No.: 44,020

[30] Foreign Application Priority Data

June 13, 1969 France..................................6919825

[52] U.S. Cl............................................................74/492
[51] Int. Cl.......................................................B62d 1/18
[58] Field of Search..................74/492, 493; 64/11; 188/1 B

[56] References Cited

UNITED STATES PATENTS 2,272,900   2/1942   Saurer.................................64/11 R
3,046,759   7/1962   Deford et al..........................64/11 R Primary Examiner—Milton Kaufman
Attorney—Larson, Taylor & Hinds

[57] ABSTRACT

To permit axial thrust of the steering column of an automobile from the shock due to an accident, the inner end of the column is constituted by two omega-shaped parts, connected to the steering mechanism through a damping device comprising two semi-circular rubber masses. The masses are precompressed between a continuous outer ring and a central sleeve constituted by two omega-shaped parts clamping between themselves the first said omega-shaped parts. Bulges are provided on the latter to separate the parts of the sleeve and to rub against them after the shock.

9 Claims, 7 Drawing Figures

PATENTED MAY 16 1972 3,662,616
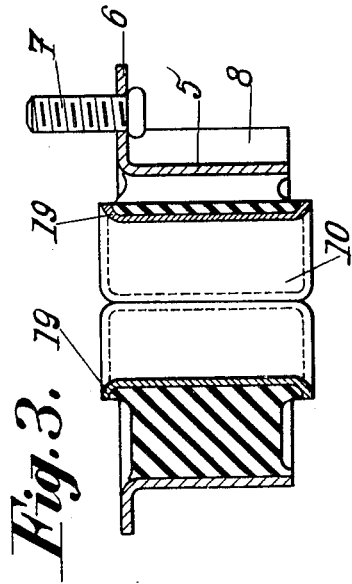
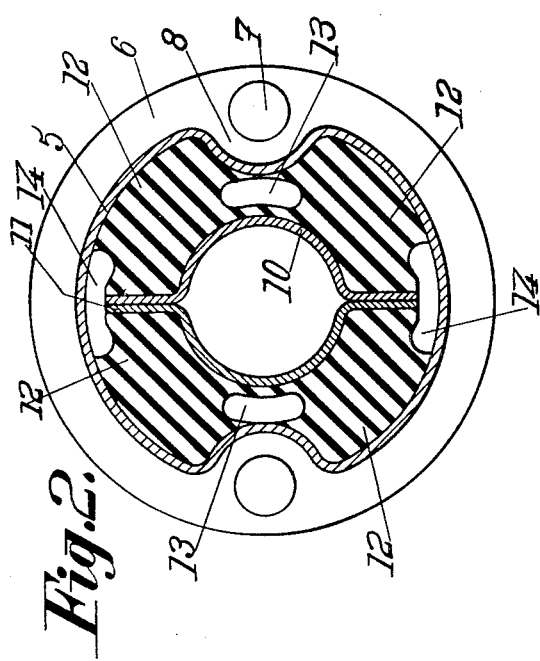
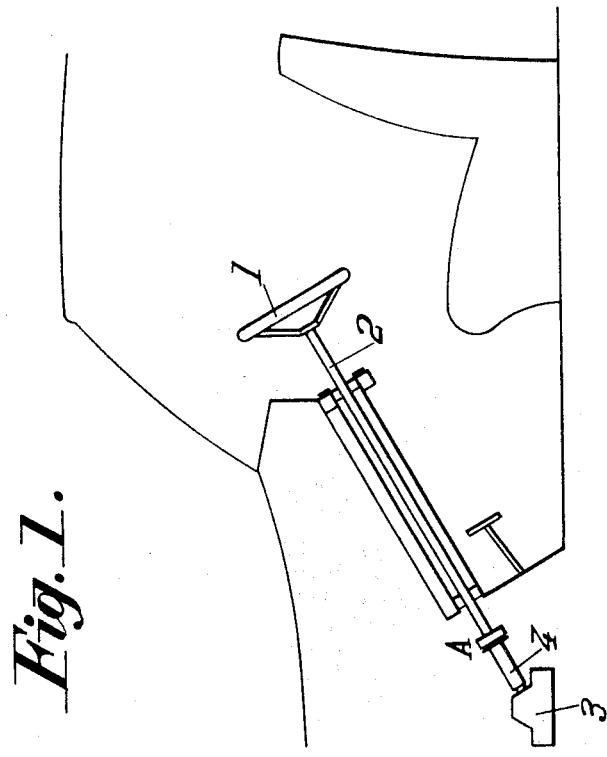

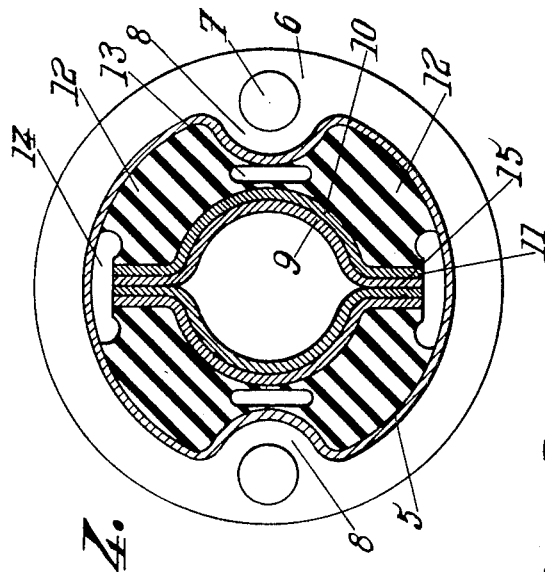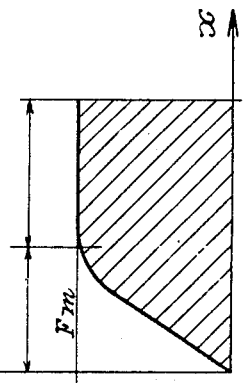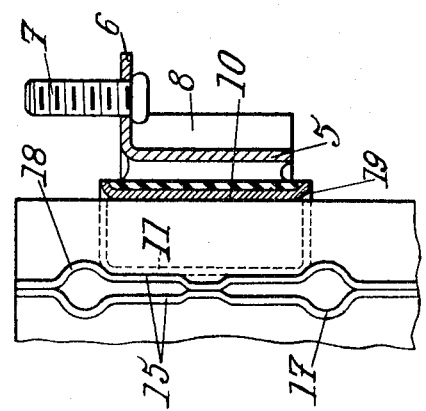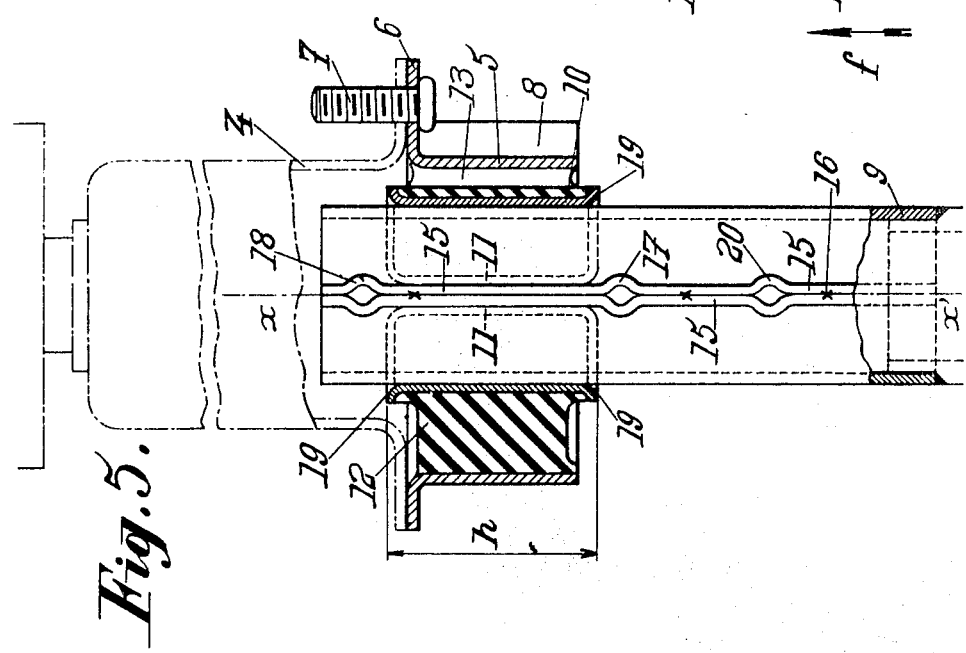

3,662,616

SHOCK ABSORBER MEANS, ESPECIALLY FOR A VEHICLE STEERING COLUMN

The invention relates to means for interposition between at least two parts, in order to absorb shocks, especially means of this type for use in combination with an automobile vehicle steering column, to avoid the shock of the wheel against the chest of the driver in case of accident.

The steering wheel of vehicles of course actuates a generally tubular column which itself actuates a mechanism (worm-sector, rack and pinion) contained inside a casing.

It is also known to connect the end of the column emerging from the said casing, to the end of the steering column, by an elastic coupling, which, on one hand, confers on the transmission of the coupling a certain torsional elasticity, generally desirable, and, on the other hand, enables the toleration between the axes of the shaft of the casing and of the steering tube of a certain disalignment which may be desired by construction, or result from slight imperfections of assembly.

In addition, it is known that, in car accidents, the shock of the chest of the driver against a rigid steering wheel constitutes a serious danger. It has therefore been sought to make the steering wheel in such a way, that under the effect of a shock, it can be moved or driven down by a certain force not dangerous to the driver.

The invention seeks to provide between the coupled parts an elastic device which can not only serve as coupling, but play a safety role, that is to say for the damping of shocks.

It consists, principally, of arranging this elastic coupling in such a way, that it enables the damping or absorption of shocks by a relative axial displacement of the two coupled parts, this displacement being effected first against an elastic deformation of elastic masses working especially in shear, after which there intervenes a displacement by friction between surfaces subject to the pressure of the said masses.

It consists, apart from this main feature, of certain others which are preferably used at the same time and which will be more explicitly discussed below.

It envisages, more especially, certain methods of application (especially that for which it is applied to safety devices for automobile vehicle steering columns), as well as certain methods of production, of the said arrangements; and it relates, more particularly again, and this by way of new industrial products, to means of the type concerned comprising the application of these same arrangements, as well as elements especially adapted for their construction and their assemblies, especially vehicles, including the said means.

And it will, in any case, be well understood with the aid of the supplementary description which follows, as well as of the accompanying drawings, which complement and drawings are, of course, non-limiting but merely exemplary.

FIG. 1, of these drawings, shows in diagrammatic elevation the assembly of a steering column and of a coupling and safety device constructed according to the invention.

FIGS. 2 and 3 show respectively in transverse section and in axial section the elements of this device, before mounting on the steering column.

FIGS. 4 and 5 show similarly the same device mounted on the said column.

FIG. 6 shows similarly to FIG. 5, a different embodiment.

FIG. 7, lastly, shows a diagram illustrating the operation of the assembly.

According to the invention, and more particularly according to that of its methods of application, as well as according to those of its methods of production, of its various parts, to which it would appear that preference should be given, in order for example to construct a device for damping shocks at the steering wheel of a car, in case of accident, procedure is as follows or in analogous manner.

To clarify the description, there is shown in FIG. 1, very diagrammatically, a steering wheel 1 connected to the casing or steering box 3 by a coupling device A which, according to the invention, must be able both to ensure the flexible driving of the mechanism and safety in case of accident.

In other words this coupling A, which will for example be mounted at its base on a connecting sleeve 4, must enable the steering column 2, in case of accident, to be displaced axially towards the inside of the said sleeve 4 thereby exerting damping forces.

These damping forces, according to the invention, will be producable under the effect of elastic masses comprised by the said coupling and in two phases, namely:

a first phase during which the said masses, which can normally serve, as is known, to transmit to the mechanism the torque exerted by the wheel, will here develop a damping force, especially by the masses working in shear, a second phase during which the column 2 will be displaced between clamping parts, thereby developing a frictional force under the action of the tension of the elastic masses.

To produce these conditions, recourse is had, for example, to the embodiment which will be described referring particularly to FIGS. 2 to 5.

The elastic coupling intended to ensure this operation comprises for example two armatures, namely (FIG. 2 and 3):

an outer armature 5, substantially cylindrical, intended to be fixed for example by means of a flange 6 on the connecting sleeve (especially by fixing bolts having on the surface indentations 8, arranged in the said armature 5), and an inner armature intended to be borne against the steering column or preferably against the lower portion of the said column 9, this armature being for example constituted by two half-cylinders 10 which, before mounting on the steering column, will be supported for example one on the other by rims 11, under the action of the elastic coupling masses, masses visible at 12 in the drawings and adhered against the facing surfaces of the two armatures.

These masses can include cavities such as 13, 14, especially to enable precompression, as will now be indicated.

As regards the assembly of the inner armature 10, 11 on the column 9, it is effected in such a way that, on the one hand, the driving in rotation can always be effected in positive manner and, on the other hand, the contact can be obtained over relatively wide surfaces to increase as much as possible the frictional force in the second above-mentioned phase.

Thus, as shown more particularly in FIGS. 4 and 5, the column 9 is constructed, in prolongation of the steering column, in the form of two half-cylinders provided with lateral rims 15 intended to be introduced between the corresponding rims 11 of the above-mentioned coupling.

In other words, on assembly of this coupling on the column 9, the two half-cylinders 10 of the inner armature must be separated from one another by compressing the rubber 12: there is hence precompression of the latter, due especially to the presence of the cavities 13, 14.

In any case, these cavities enable the flexibility to be increased and to facilitate the various relative displacements of the outer and inner armatures, at the same time in torsional, radial and conical senses.

The two parts of the shaft 9 are fixed to one another by any suitable means, for example by welding points, such as are visible at 16.

In addition, to fix the initial position of the shaft 9 with respect to the coupling, there is provided for example, on the latter, at least two bulges such as 17, 18, distinct from one another of a suitable length at the height $h$ of the coupling, that is to say of the central armature 10, of which the rims can be if necessary rounded at 19 for the purpose indicated below.

Several other bulges such as 20 can also be provided on the edges 15 of the shaft 9. The distance between the bulges such as 17 and 20 will preferably be a little less than $h$.

It is seen in any case that, in such an assembly, the precompression of the rubber depends on the thickness of the rims 15 of the shaft, which thickness can therefore be regulated with a view to obtaining, for this precompression, the optimum value suitable, on one hand, for obtaining a good torsional elasticity for rotating the steering mechanism, and, on the other hand, for obtaining the desired damping, for safety in case of shock.

FIG. 6 shows a variation according to which, to increase the precompression, separation of the respective rims 11 of each half of the shaft 9 has been provided.

An assembly such as has just been described, especially according to the embodiments of FIGS. 1 to 5, operates in the following manner.

In the normal use of the steering wheel, that is to say for rotary movements of the tube 9 around its axis $x$–$x'$, the torque applied to the wheel by the driver is transmitted to the steering box 3 by the tube 9, the rubber blocks 12, the crown 5 and the connecting sleeve 4. Due to the fact of the presence of the rubber, the transmission of the torque is effected hence with a certain flexibility, but also with an increasing rigidity with the angle of torsion and with every safety by reason of the compression of the rubber blocks 12 between the two armatures, taking into account besides the presence of the bosses 8.

In the case of axial forces (along $x$–$x'$) applied to the wheel, two cases may be distinguished:

a. if relatively slight forces are involved such as the wheel withstands ordinarily, for example when the driver exerts a thrust or a traction on its wheel to settle himself on his seat or get out from the car, the device is adjusted so that, under these conditions, the said forces are manifested only by slight shearing deformations of the rubber, the central armature 10 being drawn into the displacements of the wheel and of the tube 9, by the bulges 17, 18, b. if the axial forces are violent, resulting for example from the shock to the chest of the driver in an accident, there then results a thrusting force on the tube 9, in the direction of the arrow $f$.

Under these conditions, there is first of all obviously a shearing deformation of the rubber, but when the applied force F reaches a certain maximal value $F_m$, the bulge 17 is introduced between the rims or flat parts 11 of the central armature, separating them, by means of a certain compression of the rubber (this introduction is facilitated by the previously indicated rounded portions 19); from this moment, the shearing deformation of the rubber remains constant but the travel can continue by displacement with friction of the bulge 17 between the rims 11. If the possible travel is sufficiently long, the bulges such as 20 are introduced before the preceding bulge 17 has emerged from the other end, so as to ensure constantly the maximum friction.

The adjustment of the device is effected so that the maximal force $F_m$ is, on one hand, sufficiently low not to be dangerous for the driver, on the other hand, sufficiently high so that the sliding is not initiated inadvertantly and without need in the course of normal action on the wheel, sufficiently high also for the energy absorbed to be the greatest possible. This energy which, as shown in the diagram of FIG. 7, where it is represented by the hatched area, is the sum of the energy released in the elastic deformation and the displacement with friction; it is for a maximum admissible force $F_m$ all the greater as the allowable travel before the stop is greater.

In other words, the maximum force $F_m$ which, whatever the circumstances, will be much lower than the force which will be applied on a rigid assembly, will besides be adjustable to a value all the lower as the travel to absorb the energy of the shock is arranged to be greater.

It is self-evident that any means may be provided to increase the frictional surfaces in the course of the second phase: thus, the bulge such as 17 could be enlarged at 21. In this way, in place of having a relatively slight contact surface, limited to the projection of the bulge 17, the contact could occur over the whole extent of the surface 21 and, due to this fact, the damping force will be increased.

Advantageously, and always for the same purpose, frictional surfaces or soles of a suitable material, could be inserted between a frictional surface of the shaft 9 and the corresponding rims 11.

As a result of which, whatever the embodiment adopted, there can be constructed devices of which the operation emerges sufficiently from the preceding description for it to be unnecessary to pursue this subject and which have, with respect to the means of the type concerned already existing, numerous advantages, especially:

that of enabling the wheel to be moved away and the safety belts of thus acting with their full efficiency in the case of an accident, that of enabling a considerable energy to be absorbed and of thus reducing the force of shock borne by the driver, and that, lastly, of playing also, as normally, the role of coupling to transmit torque to the steering mechanism.

As is self-evident, and as emerges already besides from the preceding description, the invention is in no way limited to that of its methods of application, nor to those of its methods of production, of its various parts, which have been more particularly considered; it embraces, on the contrary, all variations.

What is claimed is:

1. Damping device in combination with and interposed between at least two parts, especially between a steering column of an automobile vehicle and a part connected to the steering mechanism, said device comprising an elastic coupling including elastic masses, first means clamping said elastic masses peripherally and connected rigidly to one said part, and second means disposed in internal contact with said elastic masses and connected rigidly to the other said part, so as to permit the damping of shocks by said elastic masses on relative axial displacement of said two parts, said displacement being effected first against an initial elastic deformation of said elastic masses working especially in shear, said other part and said second means being arranged for relative axial frictional displacement only after said initial deformation, between the surfaces subjected to the pressure of said masses.

2. The combination according to claim 1, wherein said means comprise two armatures inside one another, one armature being connected to the steering mechanism, the other armature to the steering column, with the elastic masses between said two armatures and arranged to provide friction between the inner armature and the steering column beyond said initial deformation.

3. The combination according to claim 2, wherein the inner armature is constituted by two cylindrical parts with lateral rims, and the steering column itself comprises two half-parts arranged in similar manner, the introduction of the column into the inner armature causing precompression of the elastic masses.

4. The combination according to claim 3, wherein the outer rims of the two half-cylinders of the steering column comprise bulges which position the said column with respect to the coupling, and which, in addition, during the relative axial displacement of the column with respect to the coupling, have the effect of further separating the two half-parts of the inner armature of the coupling and of increasing the compression of the masses, whilst causing thereby a damping friction.

5. The combination according to claim 3, wherein on the edges of the two half-parts of the steering column, are provided bulges enabling the two half-parts of the inner armature to be kept separated in the course of damping friction.

6. The combination according to claim 5, wherein certain of said bulges have an enlarged shape to enable the contact surfaces to be increased.

7. The combination according to claim 1, wherein to facilitate the precompression of the rubber, cavities are provided in the elastic masses.

8. The combination according to claim 7, wherein the inner armature is constituted by two cylindrical parts with lateral rims, and the steering column itself comprises two half-parts arranged in similar manner, the introduction of the column into the inner armature causing precompression of the elastic masses.

9. The combination according to claim 8, wherein on the edges of the two half-parts of the steering column, are provided bulges enabling the two half-parts of the inner armature to be kept separated in the course of damping friction.

* * * * *